Aug. 31, 1937.  N. O. PANZEGRAU  2,091,484
OIL SEAL
Filed Oct. 14, 1935  2 Sheets-Sheet 2

Inventor
Norman O. Panzegrau
By ...
Atty.

Patented Aug. 31, 1937

2,091,484

UNITED STATES PATENT OFFICE 2,091,484

OIL SEAL

Norman O. Panzegrau, Chicago, Ill., assignor to International Harvester Company, a corporation of New Jersey Application October 14, 1935, Serial No. 44,876

5 Claims. (Cl. 286—7)

This invention relates to oil seals which find use in mechanical structures between two relatively movable parts, wherein it is desired to prevent leakage of oil.

The main object of the invention is to provide an improved oil seal.

Another object is to provide an oil seal of self-contained, unitary construction to enable the same to be readily manufactured and easily assembled in its position between relatively movable parts.

Another object is to provide an improved seal of the floating and self-aligning type.

Other objects will become apparent to those skilled in the art as the disclose is more fully made.

These important objects are achieved by the illustrative example of the invention herein to be disclosed in which the practicable embodiment chosen for the purposes of disclosure comprises a channel-shaped retainer of annular form adapted to occupy a labyrinthine annular passage located between two relatively movable parts. The inner diameter flange of the channel retainer is notched to receive the radially inwardly disposed tongue of an annular washer. This washer at spaced intervals around its annular form carries pins, the pins being formed to secure an L-shaped leather or the like packing to the washer, the L-leg being pressed to duty against the inner periphery of the inner diameter flange of the retainer by means of an annular spring. This annular spring is of channel cross section and is notched to provide an annular inner diameter row of spring fingers to press the leg of the L-shaped seal tightly against the inner diameter flange of the retainer, whereas the outer diameter row of spring fingers in this channel-shaped, annular spring bears against the outer diameter flange of the channel-shaped retainer. The pins mentioned hold this channel-shaped spring to the washer mentioned with the L-shaped seal clamped tightly therebetween. Abutting the outer face of the washer is a felt or leather washer or packing, which bears against an adjacent face of one of the relatively movable parts for sealing purposes, and coil springs are seated on the pins mentioned, which springs bear against the back of the channel-shaped retainer to press the whole seal structure and the leather packing washer into sealing engagement in the annular labyrinthine passage to prevent leakage of oil.

In the accompanying sheets of drawings,—

Figure 1:
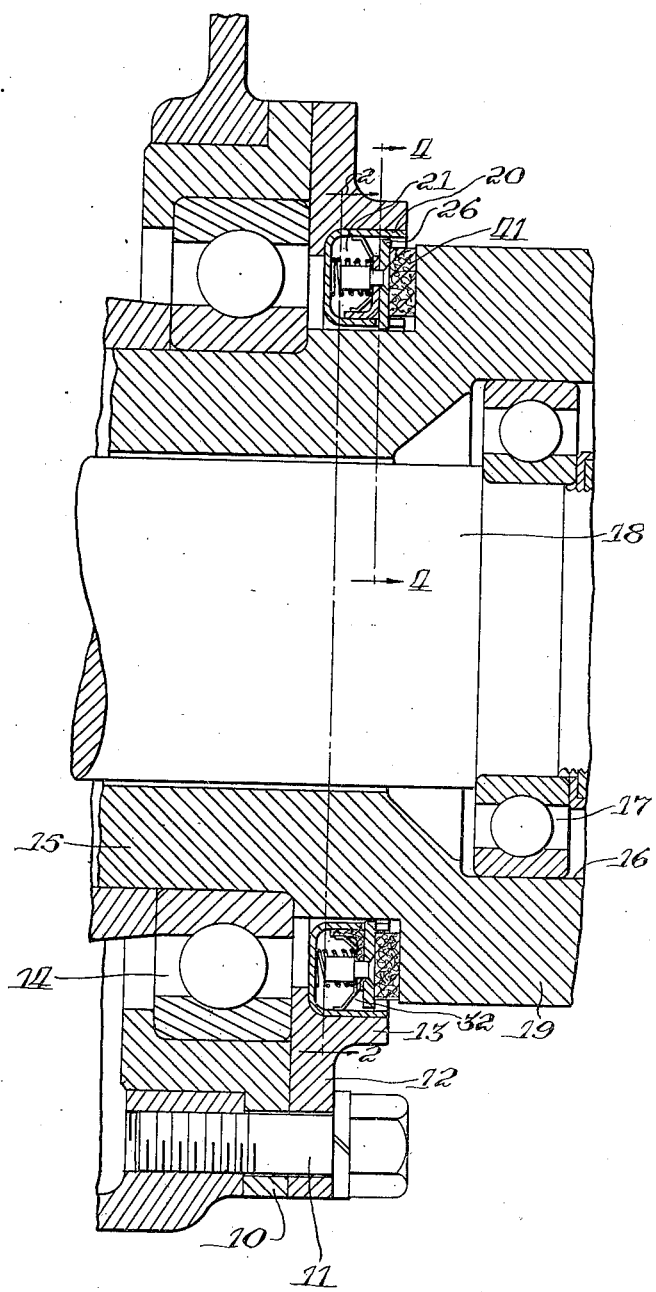
Figure 1 is a vertical sectional view through two relatively movable parts, showing the annular labyrinthine passage occupied by the improved self-contained seal of this invention.
Figure 2:
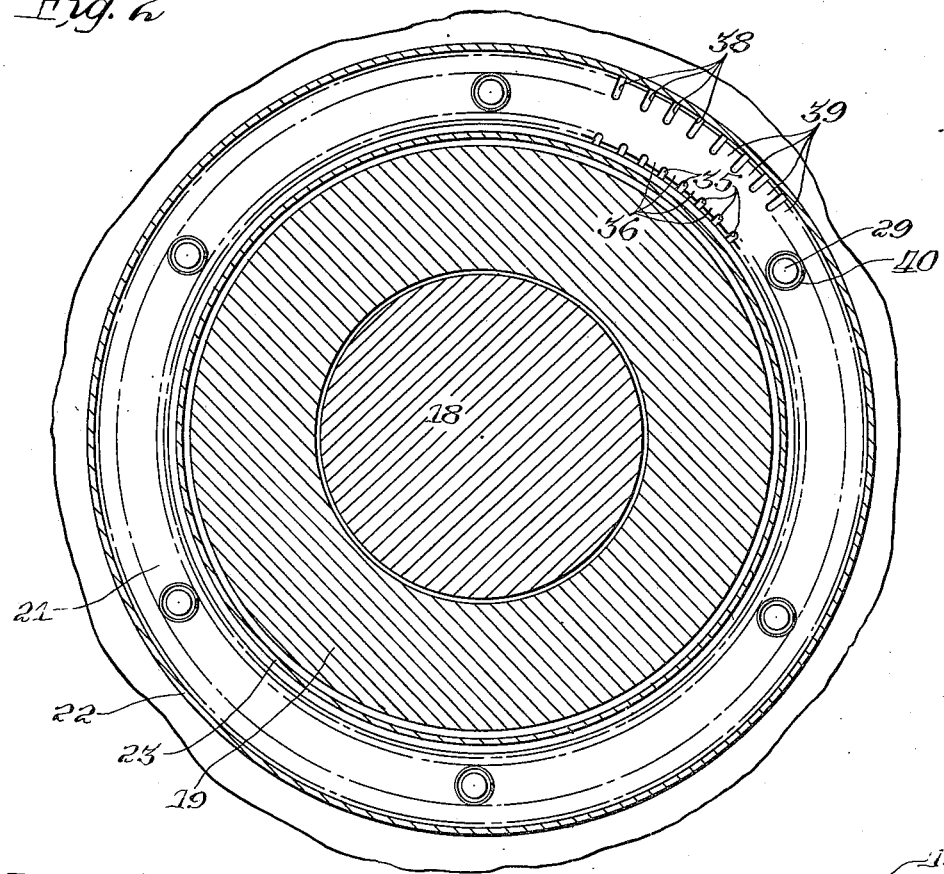
Figure 2 is a cross sectional view through the same structure, taken along the line 2—2 of Figure 1, looking in the direction of the arrows.

For the sake of illustration there has been shown in Figure 1 a stationary frame 10 to which is secured by a bolt circle 11 a cap 12 including an annular sleeve extension 13. The frame piece 10 carries a bearing 14 for mounting a rotatable sleeve 15, which in turn is hollowed out at 16 for mounting a bearing 17 to journal the shaft 18. It will be noted that the sleeve 15 has an upset 19 of annular form, thus providing an annular labyrinthine passage 20 between the stationary part 12 and the relatively movable part 19. It is important that this annular passage 20 be occupied by a seal to prevent dirt from getting into the bearing 14 and to prevent oil from leaking out of the passage 20. Accordingly, the improved seal structure of this invention is provided, which will now be described.

Figure 3:
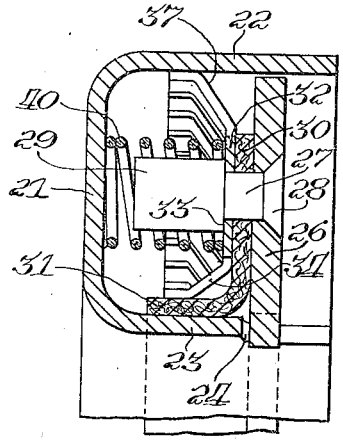
Figure 3 is a sectional view taken along a radial line through a portion of the self-contained seal, per se; and, Figure 4 is a detail sectional view taken along the line 4—4 of Figure 1, looking in the direction of the arrows.
Figure 4:
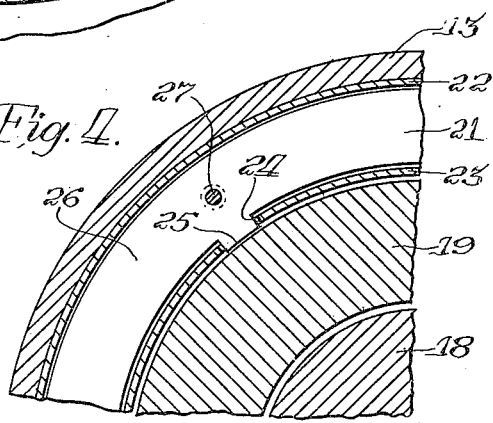

As shown in Figures 1 and 3, the seal comprises an annular channel-shaped retainer 21 having an outer diameter flange 22 and an inner diameter flange 23. At spaced intervals the inner diameter flange 23 is notched, as at 24, to receive tongues 25 struck radially inwardly from the inner periphery of a washer 26. This annular washer 26, therefore, interfits the inner diameter flange 23 of the retainer 21 in such a manner that the retainer and the washer are locked together against relative rotational movement. The washer 26, as shown in Figure 3, carries, at angularly spaced intervals, pins 27 having countersunk heads 28, so that the outer surface of the washer 26 will be smooth and flush, without any protuberances extending therefrom. These pins 27 are enlarged, as at 29, and extend in a direction toward the bight of the annular channel-shaped retainer 21. The narrow part 27 of each pin, as shown in Figure 3, is passed through a leather packing, or flexible diaphragm seal 30, which is L-shaped in cross section, the leg of the L shown at 31 lying flatly against the inside surface of the inside diameter flange 23 of the retainer 21. A channel-shaped spring of annular form is shown at 32, the bight portion of which is backed against the sealing element 30. The pins 29 have shoulders 33 for clamping the spring element 32 and sealing element 30 firmly against the washer 26, as shown in Figure 3.

As has been stated, this spring element 32 is of channel, annular shape, the inside diameter flange of the spring element being shown at 34, the same being notched at intervals, as at 35, to provide spring tongues 36 that firmly press the leg 31 of the sealing element 30 to duty against the inner diameter flange 23 of the retainer 21. Similarly, the outer diameter flange of the spring element, which is shown at 37, is notched at 38 to provide tongues 39 that bear firmly and resiliently against the outer diameter flange 22 of the retainer ring 21. Compression coil springs 40 encircle the enlarged portions 29 of the pins 27, said springs serving to push the assembled spring 32, sealing element 30 and washer 26 in an axial direction.

This entire sealing structure is assembled inside the channel of the retainer 21 and then, as a self-contained unit, is placed in the annular labyrinthine passage, as shown in Figure 1, substantially to occupy the entire passage. When so located in place, a sealing ring comprising a felt or leather washer 41 is located between the washer 26 and the adjacent wall in the passage 20 of the upset 19 on the movable part 15.

It will thus be seen that a self-contained oil seal structure has been provided, which achieves the desired objects of the invention heretofore recited. In assembling the seal the assembled unitary seal structure is carried with the retainer 21 into the annular labyrinthine passage 20 and pressed thereinto, as shown in Figure 1. The leather or felt washer 41 is then located in place and the assembly is complete. As the part 19 rotates relative to the part 13, the retainer 21 with the seal therein can float, or, in other words, the same is self-aligning. The washer 26, however, cannot have any relative movement with respect to the retainer 21 because of the groove and tongue connection 24 and 25 described. However, under the force of the spring 40, the sealing parts 26, 30 and the spring 32 are pressed axially of the shaft 18 tightly to engage the leather washer 41 against the adjacent face of the upset 19 inside said passage 20.

It is the intention to cover all changes and modifications of the form of the seal herein illustrated which do not in material respects constitute departures from the spirit and scope of the invention as hereinafter claimed.

What is claimed is:

1. A seal for use between relatively movable parts having adjacent faces spaced apart to form an annular passage surrounding one of the parts, said seal being arranged in said passage and comprising a washer, a sealing ring against which the washer abuts, an annular channel-shaped retainer located in the passage and having interfitting connection with the washer to prevent relative rotation of the washer and retainer but permitting axial movement of the washer relative to the retainer, an L-shaped annular packing having one leg secured flatly to the washer, an annular channel-shaped spring element located within the retainer and having its bight portion backed flatly against the leg of the packing which is secured to the washer, said spring serving to effect sealing engagement of the other leg of the packing radially inwardly against the inner diameter of the retainer, and spring means located in the retainer and compressed between the bight of the retainer and the bight of channel-shaped spring element, said spring means exerting a force for moving the packing and washer in a direction axially outwardly of the retainer to engage the sealing ring against one of said relatively movable parts.

2. As an article of manufacture, a self-contained seal structure comprising an annular channel-shaped retainer including an inner diameter flange and an outer diameter flange, a flat washer closing the open side of the channel retainer, means to prevent relative rotation between the washer and retainer but permitting the washer to have axial movement relative to said retainer, an L-shaped, annular, flexible packing having one leg lying flatly against the inner face of the washer inside the retainer, the other leg of the packing lying flatly against the inner diameter flange of the retainer, an annular channel-shaped spring member inside the retainer having its bight portion backed against the packing, said spring member embodying an inner diameter series of spaced spring pressure elements to press the last mentioned leg of the packing against the retainer, said spring member also embodying an outer diameter series of spaced spring pressure elements yieldingly to abut the outer diameter flange of the retainer, pins carried by the washer at angularly spaced intervals including means for securing the spring element and seal element to the washer, and springs on the pins locked in compression between the bight of the retainer and of the spring element to exert a force pressing the spring element, packing and washer as a unit in a direction axially out of the channel of the retainer.

3. As an article of manufacture, a self-contained seal structure comprising an annular channel-shaped retainer including an inner diameter flange and an outer diameter flange, a washer closing the open side of the channel retainer, an interfitting connection between the washer and retainer to prevent relative rotation between the washer and retainer but permitting the washer to have axial movement with respect to the retainer, an L-shaped, annular, flexible, packing having one leg lying flatly against the inner face of the washer inside the retainer, the other leg of the packing lying flatly against the inner diameter flange of the retainer, an annular channel-shaped spring member inside the retainer having its bight portion backed against the packing, said spring member serving to press the last mentioned leg of the packing against the retainer, said spring member also yieldingly abutting the outer diameter flange of the retainer, means for securing the spring element and packing to the washer, and spring means compressed between the bight of the retainer and of the spring element to exert a force pressing the spring element, packing and washer as a unit in a direction out of the channel of the retainer.

4. As an article of manufacture, a self-contained seal structure comprising an annular channel-shaped retainer including an inner diameter flange and an outer diameter flange, a flat washer closing the open side of the channel retainer, an interfitting connection between the washer and retainer to prevent relative rotation between the washer and retainer but permitting endwise movement of the washer, an annular, flexible, packing having a portion lying flatly against the inner face of the washer inside the retainer, another portion of the packing lying flatly against the inner diameter flange of the retainer, an annular channel-shaped spring member inside the retainer having its bight portion backed against the packing, said spring member serving to press the last mentioned portion of the packing against the inner diameter flange of the retainer, said spring member also yieldingly abutting the outer diameter flange of the retainer, means for securing the spring element and packing to the washer, and springs locked in compression between the bight of the retainer and of the spring element to exert a force pressing the spring element, packing and washer as a unit in a direction out of the channel of the retainer.

5. A seal for use between relatively movable parts having adjacent faces spaced apart to form an annular passage surrounding one of the parts, said seal being arranged in said passage and comprising a washer, a sealing ring against which the washer abuts, an annular channel-shaped retainer located in the passage and having interfitting connection with the washer to prevent relative rotation of the washer and retainer but permitting axial movement of the washer relative to the retainer, an L-shaped annular packing having one leg secured flatly to the washer, an annular channel-shaped spring element located within the retainer and having its bight portion backed flatly against the leg of the packing which is secured to the washer, said spring serving to effect sealing engagement of the other leg of the packing radially inwardly against the inner diameter of the retainer, angularly spaced axially disposed pins carried by the washer, said pins extending into the retainer, and each pin carrying a coil spring, which springs are compressed between the bight of the retainer and the bight of the channel-shaped spring element to exert a force for moving the packing and washer in a direction axially outwardly of the retainer to engage the sealing ring against one of said relatively movable parts.

NORMAN O. PANZEGRAU.